United States Patent [19]
Valentino, Jr.

[11] 3,788,457
[45] Jan. 29, 1974

[54] GUIDE RAIL FOR A CONVEYOR
[75] Inventor: Frank Valentino, Jr., Chicago, Ill.
[73] Assignee: National Can Corporation, Chicago, Ill.
[22] Filed: Oct. 24, 1972
[21] Appl. No.: 300,105

[52] U.S. Cl. .............................................. 198/204
[51] Int. Cl. ............................................ B65g 15/60
[58] Field of Search ................................... 148/204

[56] References Cited
UNITED STATES PATENTS
| | | | |
|---|---|---|---|
| 3,491,873 | 1/1970 | Fauth | 198/204 |
| 3,669,244 | 6/1972 | Pagdin | 198/204 |
| 3,581,877 | 6/1971 | Goldberg | 198/204 |

Primary Examiner—Richard E. Aegerter

[57] ABSTRACT

A guide rail for conveyors such as endless conveyors for containers, which includes a straight, solid bar having a mounting surface and an opposite guiding surface defining a lengthwise groove with an outer constricted portion, and an insert piece configured to be mated within the groove and having a slot in the inserted portion to facilitate insertion and removal and presenting a smooth protruding surface to provide a rail facing. Other features relate to a universal mounting groove in the surface opposite the guiding surface of the bar, and to a recess of the edges of the protruding surface of the insert piece.

4 Claims, 2 Drawing Figures

3,788,457

GUIDE RAIL FOR A CONVEYOR

BACKGROUND OF THE INVENTION

This invention relates broadly to guide rails such as for conveyor lines and has particular application in guiding containers such as cans or bottles which are conveyed by means of an endless flexible cable conveyor means.

Such guide rails are set up along the conveyor means, usually parallel thereto and often mounted above the level of the conveying surface or cable. Typically upright support pieces are spaced along the conveying means and the guide rails are attached to one or more of such support pieces.

Guide rails are often made of a basic member, such as a steel or other metal piece, covered at least in part by a smooth, low abrasive material to protect the containers in contact therewith and to facilitate passage therealong. Two types of rails which are widely used are 1) a simple angle iron having one flat mounted to the support pieces and the edge of the other flat being covered with a slip cover made of a material which will present a low abrasive smooth surface to the conveyed containers, and 2) a "C" channel metal piece the partially open side of which includes means for mounting to support pieces and having a slip-on, overlying, C-shaped cover of a smooth, low abrasive material such that the surface opposite the mounting surface is covered. Other configurations of rails are used and most of these are characterized by being steel or other metal channels of various configurations or angle irons of various configurations.

Guide rails such as the types just described and others presently in use have several severe disadvantages. One primary disadvantage is that slip-on covers of low-abrasive materials such as described are easily loosened during operation. It is common in can line operations to loosen conveyor jams by "poking" at the cans with, for example, a wooden stick. This activity has been prone to catch such slip-on rail covers and cause the cover to be dislocated or fall off.

Another disadvantage relates to the difficulty in constructing curves and turns in rails to accomodate changes in the direction of the conveyor line. Because of the difficulty in bending channels and angle irons, splice plates and additional rails often would be required, particularly in constructing lines with sharp turns. Another disadvantage of previous guide rails, like the previously mentioned disadvantage, relates to the ease of line construction and cost thereof. With prior guide rails such as those previously described, the process of mounting the rails to their supporting pieces was often rendered difficult because of the necessity of making adjustments to align connection means on the rails with support points on the supporting pieces. This sort of adjustment procedure has been found to be quite time consuming. In view of the fact that a typical can manufacturing line requires on the order of 10,000 feet of guide rails, it is readily appreciated that this problem can contribute substantially to line set-up costs.

This invention overcomes all of the aforementioned problems and provides a guide rail of superior durability and performance. One important aspect of this invention is the provision of a smooth, low abrasion piece which is attached to a basic rail member by insertion rather than by slipping on the basic rail member. This overcomes the disadvantage of unreliable attachment even in the event of "poking," as is common.

Another important feature of this invention is the ability to readily bend the rail of this invention even for sharp curves. This is made possible since, rather than an angular basic member such as a channel or angle iron, the basic members are solid. A preferred method of manufacture of a solid rail is by extrusion. Using a solid basic member reduces line installation cost.

A further feature of this invention is a continuous channel means along the mounting side of the basic member of the rail. This allows attachment to support pieces along a conveyor line without concern for alignment of specific rail points with the upright support pieces. This provides addition installation and replacement efficiencies.

OBJECTS OF THE INVENTION

Summarizing, it is an object of this invention to provide a guide rail for a conveyor line, of the type used for containers, which overcomes the problems associated with prior art guide rails.

A specific object of this invention is to provide a guide rail which has the characteristic of ease of installation along conveyor lines.

Yet another object is to provide a guide rail having a smooth, low-abrasion facing piece which is connected to a basic rail member in a way rendering unintentional dislocation very unlikely, while allowing ready replacement and superior functional qualities.

These and other important objects will become apparent from the following descriptions and from the accompanying drawing which shows a preferred embodiment of this invention.

DETAILED DESCRIPTION OF THE DRAWING

Figure 2:
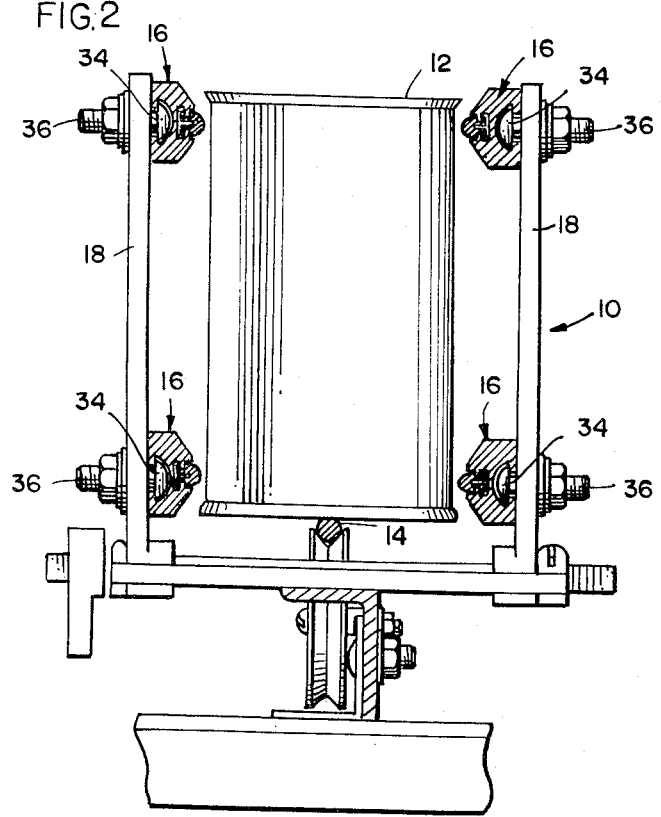
FIG. 2 is an elevation of a conveyor line having the guide rails of this invention.

Referring now in detail to the drawings, FIG. 2 shows a typical conveyor line 10 for containers such as can 12. Conveyor line 10 has an endless conveyor chord 14 upon which can 12 rests. Endless conveyor chord 14 moves containers along the conveyor line. Guide rails 16 are mounted to support pieces 18 and serve to maintain cans 12 in proper orientation with respect to endless conveyor chord 14.

Figure 1:
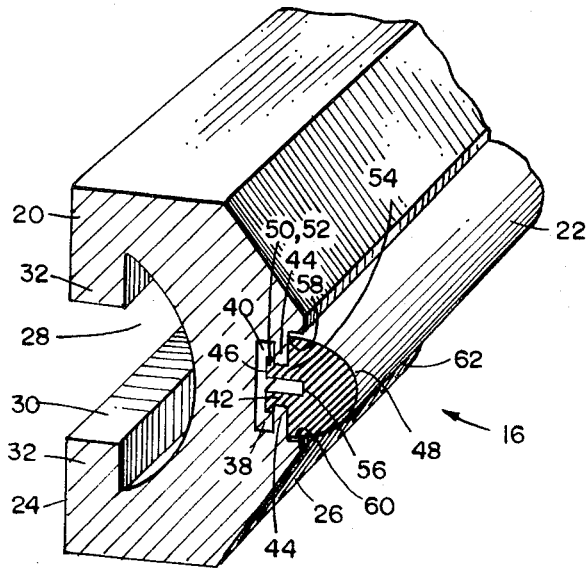
FIG. 1 is a fragmentary perspective view of the guide rail of this invention.

As shown in FIG. 2, there are four guide rails along the conveyor. An enlarged drawing of the guide rail 16, a preferred embodiment of this invention, is shown in FIG. 1. Guide rail 16 has two principal parts, a solid metal bar 20 and a flexible insert piece 22. Each of these members has a substantially uniform cross-sectional configuration along its entire length and is generally a straight, long piece. Metal bar 20 is preferably made of aluminum or an aluminum alloy. Strong, lightweight materials are preferred, but not a requirement. Insert piece 22 preferably is of a smooth, hard material which can present a low abrasion surface to containers in line 10. A very high density polyethylene is highly preferred.

Bar 20 has a mounting side surface 24 running lengthwise and an opposite guiding side surface 26. Mounting side surface 24 defines a mounting groove 28 running along bar 20. Outer constricted portion 30 defined by lips 32 is designed to hold a head 34 of a mounting bolt 36 trapped within mounting groove 28. Bolt 36 is connected to upright support pieces 18 to provide a mounting for guide rails 16. Since mounting groove 28 extends along guide rail 16, no one point on the rail must be matched with support piece 18. Since any point of guide rail 16 may be used, a universal mounting capability is provided.

Guiding side surface 26 defines a lengthwise female insert groove 38 into which insert piece 22 is inserted. The groove has an inward portion 40 of width greater than the width of an outward constricted portion 42. Ridges 44 form constricted portion 42 and hold insert piece 22 in place.

Insert piece 22 has a groove-mating surface 46 and an opposite protruding surface 48, both running lengthwise of insert piece 22. Groove-mating surface 46 has an outward enlarged portion 50 including wings 52, of width greater than the distance between ridges 44. Inwardly of enlarged portion 50 is a constricted inward portion 54 dimensioned to fit between ridges 44. A slot 56 generally transverse to groove-mating surface 46 is defined in insert piece 22 to allow wings 52 to be flexed toward each other to facilitate insertion to and removal from insert groove 38. Slot 56 is of sufficient depth for this purpose, extending inwardly from surface 46 well beyond wings 52. Slot 56 is also of sufficient width to facilitate removal while still maintaining structural strength in insert piece 22.

Protruding surface 48 bulges away from metal bar 20 to provide a rail facing for contact to cans 12. Its surface is made smooth to avoid abrasion of passing containers. Protruding surface 48 has edges 58 which are recessed into an indentation 60 defined in guiding side surface 26. Such a configuration further reduces the likelihood of accidental displacement of insert piece 22.

Guiding side surface 26 of bar 20 has beveled portions 62 falling away from insert piece 22. Such bevels are preferred to improve bendability, save material cost, and also to make bar 20 more remote from passing containers.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

I claim:

1. In a guide rail of the type for mounting to support pieces spaced along a conveyor and having a structural piece and an attached facing piece, the improvement comprising:

a straight, substantially solid bar of substantially uniform cross-sectional configuration, having lengthwise surfaces including a mounting side surface defining a mounting groove and a guiding side surface, said guiding side surface defining a lengthwise female insert groove having an inward first width and a constricted outward second width; and a straight flexible insert piece of substantially uniform cross-sectional configuration, connected by means of said insert groove along said bar, said piece having lengthwise surfaces including a groove-mating surface and a protruding surface, said groove-mating surface having an outward enlarged portion of width greater than said second width and a constricted inward portion of width no greater than said second width, said groove-mating surface defining a slot transverse thereof to facilitate insertion to and removal from said groove, said protruding surface being smooth to provide a rail facing.

2. The guide rail of claim 1 wherein said (mounting side surface defines a mounting groove, said) mounting groove has (having) an outer constricted portion defined by lips on either edge thereof, (said mounting groove) thereby providing a universal mounting capability.

3. The guide rail of claim 1 wherein the edges of said protruding surfaces are recessed into an indentation defined in said guiding side surface.

4. In a guide rail of the type for mounting to support pieces spaced along a conveyor and having a structural piece and an attached facing piece, the improvement comprising:

a straight, substantially solid bar of substantially uniform cross-sectional configuration, having lengthwise surfaces including a mounting side surface defining a mounting groove having an outer constricted portion defined by lips on either edge thereof, said mounting groove thereby providing universal mounting capability; and a guiding side surface, said guiding side surface defining a lengthwise female insert groove having an inward first width and a constricted outward second width; and a straight flexible insert piece of substantially uniform cross-sectional configuration, connected by means of said insert groove along said bar, said piece having lengthwise surfaces including a groove-mating surface and a protruding surface with the edges of said protruding surface being recessed into an indentation defined in said guiding side surface, said groove-mating surface having an outward enlarged portion of width greater than said second width and a constricted inner portion of width no greater than said second width, said groove-mating surface defining a slot transverse thereof to facilitate insertion to and removal from said groove, said protruding surface being smooth to provide a rail facing.

* * * * *